D. C. RULE, Jr.
POTATO CUTTER.
APPLICATION FILED JULY 29, 1907.
906,300.
Patented Dec. 8, 1908.
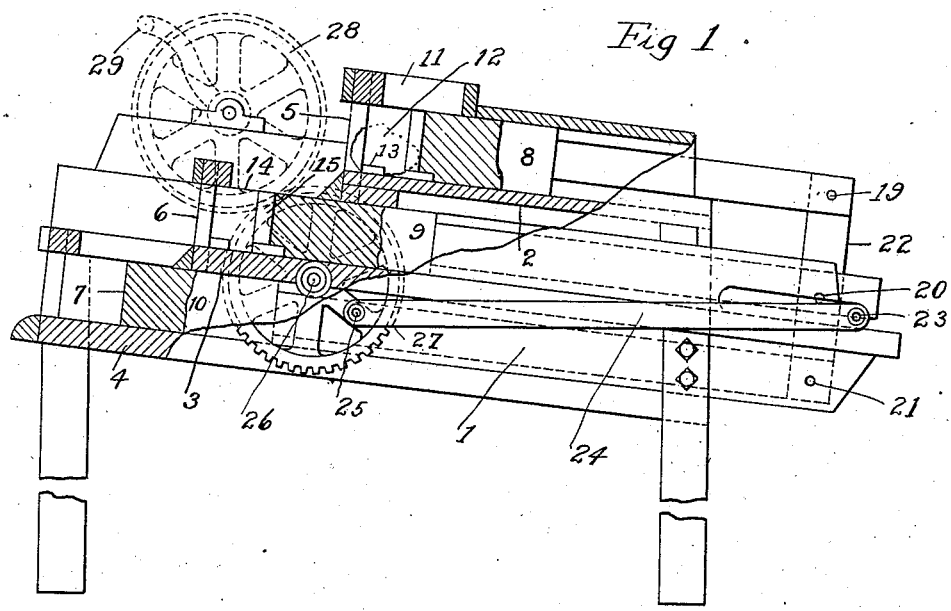
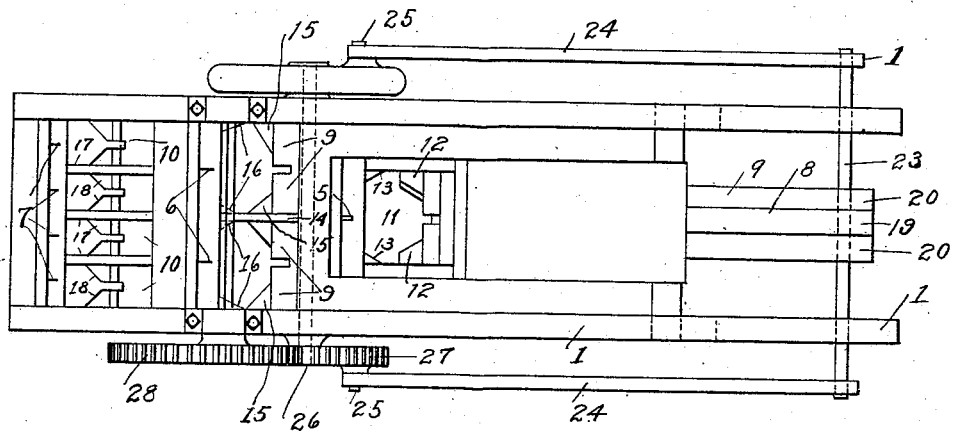
Witnesses
Geo. S. Cole
Lucille O'Neill
Inventor
Daniel C. Rule Jr.
by Wm. M. Monroe
Attorney
THE NORRIS PETERS CO., WASHINGTON, D. C.

UNITED STATES PATENT OFFICE.

DANIEL C. RULE, JR., OF GREEN SPRING, OHIO.

POTATO-CUTTER.

No. 906,300.　　　　Specification of Letters Patent.　　　　Patented Dec. 8, 1908.

Application filed July 29, 1907.　Serial No. 385,994.

*To all whom it may concern:*

Be it known that I, DANIEL C. RULE, Jr., a citizen of the United States, and resident of Green Spring, county of Seneca, State of Ohio, have invented certain new and useful Improvements in Potato-Cutters, of which I hereby declare the following to be a full, clear, and exact description, such as will enable others skilled in the art to which it appertains to make and use the same.

The objects of the invention are to provide a device for slicing vegetables into parts of substantially the same size, and the device is particularly adapted to cutting potatoes into small portions for planting, so that the eyes of the potato will be separated and they can be scattered to plant more than one hill.

The invention comprises stationary knives and plungers designed to convey the potato against the knives and further consists in the arrangements of the knives and plungers in banks one above the other; the upper bank containing only one knife and plunger, and the lower banks containing knives and plungers in multiple numbers thereof, each bank of knives and plungers being a multiple in number of the bank next above it. As a result of this arrangement each potato is first divided into two parts and each part again subdivided into equal parts until the potato is subdivided into as many parts as may be desired.

The invention further consists in the reciprocating mechanism for the knives, in centering devices for bringing the several potato parts into central alinement with the cutting knives, and in the combination and arrangement of the various parts as hereinafter described and shown in the accompanying drawings, and specifically pointed out in the claims.

In the accompanying drawings, Figure 1 is a vertical longitudinal section of the device; Fig. 2 is a plan view thereof.

In these views 1 is the frame of the machine; 2, 3, and 4 are floors therein; 5, 6, 6, 7, 7, are vertical knives secured in the floors and in transverse bars in the frame. These knives are placed as follows: There is one 5 centrally placed in the upper floor, two 6 are placed in the middle floor and four 7 are placed in the lower floor. The knives are equally spaced in each floor and are set therein rigidly.

8, 9, 9, 10, 10, are plungers; the one 8 upon the upper is adapted to push one potato dropped into the opening 11 into contact with knife 5. The forward end of the upper plunger is provided with inclined edges 12, which tend to throw the potato toward the center so that the knife 5 will cut it squarely in two. Inclines 13 upon the floor, one on each side of the knife serve to assist in accomplishing the same purpose. As soon as the halves of the potato are separated by knife 5, they fall into the middle floor, one on each side of the central partition 14; they are then pushed backward by means of the plungers 9, 9, which are provided with similar inclined edges 15, 15 by means of which the parts are centered to meet the knives 6, 6. Similar inclined strips 16, 16, are also placed upon the floor. The potatoes fall from these knives upon the third floor between partitions 17, 17, and are pushed forward by means of four plunger heads 10, 10, against knives 7, 7. Inclined edges 18, 18, are added to the plungers to bring the potatoes centrally against the knives. In this manner when the machine is full, the potato is cut into 14 parts and a fresh potato is fed into the machine with each reciprocation. In this manner the vegetables are rapidly cut into parts the proper size for planting.

The plungers are extended rearwardly and attached severally at 19, 20, and 21 to a vertical crosshead, 22, a transverse bar 23, and connecting rods 24, connect these plungers with the crank pins, 25, upon the shaft 26, and the gear wheels 27 and 28, and crank 29 are employed to operate the crank pins.

The several floors are preferably inclined to keep the vegetable parts in close contact with the plungers.

Having described the invention, what I claim as new and desire to secure by Letters Patent is:

1. In a vegetable cutter, vertical stationary knives and substantially horizontal reciprocating plungers, arranged in banks, floors upon which said plungers operate, each bank of knives and plungers being a multiple number of the next bank above, and partitions separating the plungers in each bank.

2. In a vegetable cutter, the combination of stationary vertical knives spaced across the machine, horizontally reciprocating plungers, the said knives and plungers being arranged in banks at different levels, floors upon which the said plungers operate, each bank of knives and plungers being a multiple number of the next bank above, partitions separating the plungers in each bank, inclined edges for each plunger and means for reciprocating said plungers.

In testimony whereof I hereunto set my hand this 27th day of June 1907.

DANIEL C. RULE, JR.

In presence of—
  W. A. WOLFE,
  T. DAILEY.